United States Patent
Yakubo et al.

(10) Patent No.: US 10,892,107 B2
(45) Date of Patent: Jan. 12, 2021

(54) METHOD FOR PRODUCING TITANIUM OXIDE PARTICLES, TITANIUM OXIDE PARTICLES, DISPERSION SOLUTION OF TITANIUM OXIDE PARTICLES, TITANIUM OXIDE PASTE, TITANIUM OXIDE FILM, AND DYE-SENSITIZED SOLAR CELL

(71) Applicant: SUMITOMO OSAKA CEMENT CO., LTD., Tokyo (JP)

(72) Inventors: Teppei Yakubo, Tokyo (JP); Shingo Takano, Tokyo (JP)

(73) Assignee: SUMITOMO OSAKA CEMENT CO., LTD., Tokyo (JP)

(*) Notice: Subject to any disclaimer, the term of this patent is extended or adjusted under 35 U.S.C. 154(b) by 128 days.

(21) Appl. No.: 15/515,053

(22) PCT Filed: Sep. 29, 2015

(86) PCT No.: PCT/JP2015/077606
§ 371 (c)(1),
(2) Date: Mar. 28, 2017

(87) PCT Pub. No.: WO2016/052561
PCT Pub. Date: Apr. 7, 2016

(65) Prior Publication Data
US 2017/0221640 A1 Aug. 3, 2017

(30) Foreign Application Priority Data
Sep. 30, 2014 (JP) ................. 2014-201782

(51) Int. Cl.
| | |
|---|---|
| *C01G 23/053* | (2006.01) |
| *H01G 9/20* | (2006.01) |
| *B05D 1/00* | (2006.01) |
| *B05D 1/02* | (2006.01) |
| *B05D 1/18* | (2006.01) |
| *C09D 1/00* | (2006.01) |
| *C09D 5/24* | (2006.01) |

(52) U.S. Cl.
CPC ........... *H01G 9/2031* (2013.01); *B05D 1/005* (2013.01); *B05D 1/02* (2013.01); *B05D 1/18* (2013.01); *C01G 23/053* (2013.01); *C09D 1/00* (2013.01); *C09D 5/24* (2013.01); *H01G 9/20* (2013.01); *H01G 9/2059* (2013.01); *C01P 2002/72* (2013.01); *C01P 2002/74* (2013.01); *C01P 2004/64* (2013.01); *C01P 2006/12* (2013.01); *C01P 2006/80* (2013.01); *Y02E 10/542* (2013.01); *Y02P 70/50* (2015.11)

(58) Field of Classification Search
CPC ...... H01G 9/2059; H01G 9/2031; H01G 9/20; C09D 1/00; C09D 5/24; C01G 23/053; Y02E 10/542; B05D 1/005; B05D 1/02; B05D 1/18; Y02P 70/50; Y02P 70/521; C01P 2002/72; C01P 2002/74; C01P 2006/12; C01P 2006/80; C01P 2004/64
See application file for complete search history.

(56) References Cited

U.S. PATENT DOCUMENTS

| | | | | |
|---|---|---|---|---|
| 2006/0254461 A1* | 11/2006 | Hong | ................... | B01J 31/1815 106/287.19 |
| 2012/0058395 A1 | 3/2012 | Harada et al. | | |

FOREIGN PATENT DOCUMENTS

| | | |
|---|---|---|
| CN | 1500549 A | 6/2004 |
| CN | 103523826 A | 1/2014 |
| CN | 102689917 A | 5/2014 |
| EP | 1721867 A2 | 11/2006 |
| JP | 2007176753 A * | 7/2007 |
| JP | 2007176753 A | 7/2007 |
| JP | 2008095015 A | 4/2008 |
| JP | 2012059467 A | 3/2012 |
| WO | 2012060280 A1 | 5/2012 |
| WO | WO-2012060280 A1 * | 5/2012 ........... H01G 9/2031 |

OTHER PUBLICATIONS

Machine translation of WO 2012/060280, Maki et al., retreived from https://patentscope.wipo.int/search/en/detail.jsf?docId=WO2012060280&tab=FULLTEXT&maxRec=1000. (Year: 2012).*
Machine translation of JP-2007176753-A, Ishida et al. (Year: 2007).*
Machine translation of WO-2012060280-A1, Maki et al. (Year: 2012).*
Written Opinion of the International Searching Authority dated Dec. 15, 2015 for PCT/JP2015/077606 and English translation.
First Office Action dated May 24, 2018 from corresponding Chinese Patent Application No. 201580052114.3 and English Summary.
Extended European Search Report dated Apr. 5, 2018 from corresponding European Patent Application No. 15846539.3.
International Search Report dated Dec. 15, 2015 for PCT/JP2015/077606 and English translation.
Office Action dated Mar. 26, 2019 from corresponding Japanese Patent Application No. 2016-552096 and English translation.
Office Action dated Apr. 3, 2019 from corresponding Chinese Patent Application No. 201580052114.3 and English translation.
JPO, Office Action for Japanese Patent Application No. 2016-552096, dated Dec. 3, 2019, with English translation.
CNIPA, Notice of Allowance for Chinese Patent Application No. 201580052114.3, dated Dec. 5, 2019, with English translation.

(Continued)

*Primary Examiner* — Mayla Gonzalez Ramos
(74) *Attorney, Agent, or Firm* — Lucas & Mercanti, LLP

(57) ABSTRACT

The present invention relates to a method for producing titanium oxide particles, comprising a step of producing a mixed solution by mixing a hydrolysis product of a titanium alkoxide or a titanium metal salt and a compound having a five-membered ring containing nitrogen and a step of generating titanium oxide fine particles by heating and pressurizing the mixed solution, titanium oxide particles produced by the same production method, a dispersion solution of titanium oxide particles produced using the same titanium oxide particles, titanium oxide paste, a titanium oxide film, and a dye-sensitized solar cell.

3 Claims, No Drawings

(56) References Cited

OTHER PUBLICATIONS

JPO, Notice of Allowance for Japanese Patent Application No. 2016-552096, dated Apr. 14, 2020, with English translation.
EPO, Office Action for European Patent Application No. 15 846 539.3, dated Apr. 24, 2020.

* cited by examiner

METHOD FOR PRODUCING TITANIUM OXIDE PARTICLES, TITANIUM OXIDE PARTICLES, DISPERSION SOLUTION OF TITANIUM OXIDE PARTICLES, TITANIUM OXIDE PASTE, TITANIUM OXIDE FILM, AND DYE-SENSITIZED SOLAR CELL

CROSS REFERENCE TO RELATED APPLICATION

This Application is a 371 of PCT/JP2015/077606 filed on Sep. 29, 2015, which, in turn, claimed the priority of Japanese Patent Application No. JP 2014-201782 filed on Sep. 30, 2014, both applications are incorporated herein by reference.

TECHNICAL FIELD

The present invention relates to a method for producing titanium oxide particles, titanium oxide particles produced by the same production method, a dispersion solution of titanium oxide particles produced using the same titanium oxide particles, titanium oxide paste, a titanium oxide film, and a dye-sensitized solar cell.

BACKGROUND ART

Titanium oxide particles are used in a variety of fields. For example, titanium oxide particles are used as materials for capacitors, materials for sensors for which the properties of an n-type semiconductor are used, pigments, optical materials, catalysts, chemically active materials, materials for photosemiconductor porous films in dye-sensitized solar cells, and the like. Generally, titanium oxide particles are produced by a sulfuric acid method or a chlorine method. In the sulfuric acid method, ilmenite is separated into titanium sulfate and iron sulfate by being melted with concentrated sulfuric acid, then, the titanium sulfate is hydrolyzed, dried, and calcinated, thereby producing titanium oxide particles. On the other hand, in the chlorine method, a titanium raw material is treated with chlorine gas so as to produce $TiCl_4$, and $TiCl_4$ is evaporated and oxidized, thereby producing titanium oxide particles.

However, depending on the applications of titanium oxide, there are cases in which titanium oxide particles having a narrower particle size distribution and better crystallinity than titanium oxide produced by the sulfuric acid method and the chlorine method are required. As a method for producing titanium oxide fine particles which produces the above-described titanium oxide particles, for example, a method for producing titanium oxide particles described in Patent Literature No. 1 is known. According to this production method, a hydrolysis product of a titanium alkoxide or a titanium metal salt is used as a starting material, an alkaline aqueous solution including tetramethylammonium hydroxide (TMAH), water, and a diol or a triol are added to and mixed with the starting material so as to produce a mixed solution, and this mixed solution is hydrothermally treated, whereby titanium oxide particles can be produced.

DOCUMENTS OF RELATED ART

Patent Literature

[Patent Literature No. 1] Japanese Laid-open Patent Publication No. 2007-176753

SUMMARY OF INVENTION

Technical Problem

TMAH that is used in the method for producing titanium oxide fine particles described in Patent Literature No. 1 was newly designated as a poisonous substance by Designation of Poisonous and Deleterious Substances, Cabinet Order, partially amended on Jul. 25, 2013. Therefore, in order to use TMAH, notification of poisonous substance production facilities becomes necessary, and it is necessary to store TMAH and mixed solutions and the like including TMAH in closed places. Therefore, in the production of titanium oxide particles using TMAH, the number of limitations on the production of titanium oxide particles increases, which creates a problem in that it becomes extremely troublesome to produce titanium oxide particles.

The present invention has been made in order to solve the above-described problem, and an object of the present invention is to provide a method for producing titanium oxide particles in which titanium oxide particles having excellent characteristics can be produced even without using TMAH, titanium oxide particles produced by the same production method, a dispersion solution of titanium oxide particles produced using the same titanium oxide particles, titanium oxide paste, a titanium oxide film, and a dye-sensitized solar cell having a high photoelectric conversion efficiency.

Solution to Problem

As a result of intensive studies, the present inventors found that the use of a compound having a five-membered ring containing nitrogen enables the production of titanium oxide particles having characteristics that are equal to or better than the characteristics of titanium oxide particles produced using TMAH and completed the present invention. That is, the present invention is as described below.

[1] A method for producing titanium oxide particles, comprising: a step of producing a mixed solution by mixing a hydrolysis product of a titanium alkoxide or a titanium metal salt and a compound having a five-membered ring containing nitrogen; and a step of generating titanium oxide fine particles by heating and pressurizing the mixed solution.

[2] The method for producing titanium oxide particles according to [1], wherein the compound having a five-membered ring containing nitrogen is at least one compound selected from the group consisting of pyrrole, imidazole, indole, purine, pyrrolidine, pyrazole, triazole, tetrazole, isothiazole, isoxazole, furazan, carbazole, and 1,5-diazabicyclo-[4.3.0]-5-nonene.

[3] Titanium oxide particles produced by the method for producing titanium oxide particles according to [1] or [2].

[4] A dispersion solution of titanium oxide particles containing a compound having a five-membered ring containing nitrogen, wherein a ratio ($D_{XRD(100)}/D_{XRD(001)}$) of a Scherrer diameter ($D_{XRD(100)}$) that is computed from a half-value width of a diffraction peak of a (100) plane to a Scherrer diameter ($D_{XRD(001)}$) that is computed from a half-value width of a diffraction peak of a (001) plane in an X-ray diffraction pattern of the titanium oxide particles is 0.2 to 1.0, and a cumulant polydispersity index (PDI) of the titanium oxide particles measured on the basis of JIS Z8828 is 0.50 or less.

[5] Titanium oxide paste comprising: at least one of titanium oxide particles produced by the method for producing titanium oxide particles according to [1] or [2] and the dispersion solution of titanium oxide particles according to [4]; a solvent; and a binder.

[6] Titanium oxide paste comprising: titanium oxide particles; a solvent; a binder; and a compound having a five-membered ring containing nitrogen.

[7] The titanium oxide paste according to [6], comprising 3 ppm or more of the compound having a five-membered ring containing nitrogen.

[8] A titanium oxide film obtained by applying and calcinating the titanium oxide paste according to any one of [5] to [7].

[9] A dye-sensitized solar cell comprising: a conductive substrate; a photosemiconductor electrode carrying a sensitizing dye; a counter electrode; and an electrolyte, wherein the photosemiconductor electrode has the titanium oxide film according to [8].

Advantageous Effects of Invention

According to the present invention, it is possible to provide a method for producing titanium oxide particles in which titanium oxide particles having excellent characteristics can be produced even without using TMAH, titanium oxide particles produced by the same production method, a dispersion solution of titanium oxide particles produced using the same titanium oxide particles, titanium oxide paste, a titanium oxide film, and a dye-sensitized solar cell having a high photoelectric conversion efficiency.

DESCRIPTION OF EMBODIMENTS

[Method for Producing Titanium Oxide Particles]

A method for producing titanium oxide particles of the present invention comprises a step (A) of producing a mixed solution by mixing a hydrolysis product of a titanium alkoxide or a titanium metal salt and a compound having a five-membered ring containing nitrogen and a step (B) of generating titanium oxide fine particles by heating and pressurizing the mixed solution. Therefore, it is possible to produce titanium oxide particles having excellent characteristics even without using TMAH.

(Step (A))

In the step (A), a hydrolysis product of a titanium alkoxide or a titanium metal salt and a compound having a five-membered ring containing nitrogen are mixed together, thereby producing a mixed solution.

(Titanium Alkoxide and Titanium Metal Salt)

Examples of the titanium alkoxide that is used in the step (A) include tetraethoxytitanium, tetraisopropoxytitanium, tetra-n-propoxy titanium, tetra-n-butoxy titanium, and the like. From the viewpoint of the property of controlling hydrolysis rates and easy procurement, a preferred titanium alkoxide is tetraisopropoxytitanium or tetra-n-butoxy titanium, and a more preferred titanium alkoxide is tetraisopropoxytitanium. Examples of the titanium metal salt that is used in the step (A) include titanium tetrachloride, titanium sulfate, and the like.

(Hydrolysis Product)

The hydrolysis product that is used in the step (A) is not particularly limited as long as the hydrolysis product is a product generated by the hydrolysis of the titanium alkoxide or the titanium metal salt. For example, the hydrolysis product is a cake-form substance of water-containing titanium oxide which is called metatitanic acid or orthotitanic acid. The cake-form substance contains alcohols, hydrochloric acid, and sulfuric acid which are generated in the hydrolysis process. These substances act as substances hindering crystal growth and are thus cleaned with pure water using a method such as decantation, the Nutsche method, or ultrafiltration method.

(Compound Having Five-Membered Ring Containing Nitrogen)

The compound having a five-membered ring containing nitrogen which is used in the step (A) has a function as a catalyst for hydrothermal synthesis. Examples of the compound having a five-membered ring containing nitrogen which is used in the step (A) include pyrrole, imidazole, indole, purine, pyrrolidine, pyrazole, triazole, tetrazole, isothiazole, isoxazole, furazan, carbazole, 1,5-diazabicyclo-[4.3.0]-5-nonene, and the like. Since it is possible to produce titanium oxide particles having a narrow particle size distribution and excellent crystallinity, the compound having a five-membered ring containing nitrogen is preferably a compound having a five-membered ring containing nitrogen in which the number of nitrogen atoms in the five-membered ring is one. Examples of such compound having a five-membered ring containing nitrogen include pyrrole, indole, pyrrolidine, isothiazole, isoxazole, furazan, carbazole, 1,5-diazabicyclo-[4.3.0]-5-nonene, and the like. In addition, since it is possible to produce titanium oxide particles having a narrow particle size distribution and excellent crystallinity, the compound having a five-membered ring containing nitrogen is more preferably a compound in which the five-membered ring is a saturated heterocycle. Examples of such compound having a five-membered ring containing nitrogen include pyrrolidine, 1,5-diazabicyclo-[4.3.0]-5-nonene, and the like. These compounds can be used singly or two or more compounds can be used in a combined form.

The amount of the compound having a five-membered ring containing nitrogen blended into 1 mol of titanium atoms in the hydrolysis product is preferably 0.01 to 1.0 mol, more preferably 0.1 to 0.7 mol, and still more preferably 0.1 to 0.5 mol.

(Water)

In the step (A), if desired, water may be appropriately added to the hydrolysis product of the titanium alkoxide or the titanium metal salt and the compound having a five-membered ring containing nitrogen in order to adjust the concentration and the like.

Examples of the water that is used in the step (A) include deionized water, distilled water, pure water, and the like.

(Mixing)

The method for mixing the hydrolysis product of the titanium alkoxide or the titanium metal salt and the compound having a five-membered ring containing nitrogen is not particularly limited as long as homogeneous mixed solutions can be produced. For example, the above-described raw materials can be mixed together using a stirrer, a beads mill, a ball mill, an attritor, a dissolver, or the like.

(pH)

The pH of the mixed solution is preferably 9 to 13 and more preferably 11 to 13. The average particle diameter of titanium oxide particles to be obtained can be controlled by changing the pH of the mixed solution. In a case in which the pH of the mixed solution is lower than 9, there are cases in which the catalytic action of the compound having a five-membered ring containing nitrogen for nucleation becomes weak. Therefore, the nucleation rates of nuclei of particles being generated in the mixed solution in the step (B) become slow, and there are cases in which the number of the nuclei of the particles being generated in the mixed solution decreases. Therefore, the particle diameters of the respective particles increase, and there are cases in which the average particle diameter of the titanium oxide particles to be obtained is too large. On the other hand, when the pH of the mixed solution is higher than 13, the nucleation rates of nuclei of particles being generated in the mixed solution in the step (B) become fast, and there are cases in which the number of the nuclei of the particles being generated in the mixed solution excessively increases. Therefore, the particle diameters of the respective particles decrease, and there are cases in which the average particle diameter of the titanium oxide particles to be obtained is too small. In addition, when the pH of the mixed solution is higher than 13, the dispersibility of the mixed solution changes, and there are cases in which the particle size distribution width of titanium oxide particles being generated in the step (B) excessively increases.

(Concentration of Titanium in Mixed Solution)

The concentration of titanium in the mixed solution is preferably 0.05 to 3.0 mol/kg and more preferably 0.5 to 2.5 mol/kg in terms of the concentration of titanium atoms. When the concentration of titanium in the mixed solution is lower than 0.05 mol/kg, the nucleation rates of nuclei of particles being generated in the mixed solution in the step (B) become slow, and there are cases in which the number of the nuclei of the particles being generated in the mixed solution decreases. Therefore, the particle diameters of the respective particles increase, and there are cases in which the average particle diameter of the titanium oxide particles to be obtained is too large. On the other hand, when the concentration of titanium in the mixed solution is higher than 3.0 mol/kg, the nucleation rates of nuclei of particles being generated in the mixed solution in the step (B) become fast, and there are cases in which the number of the nuclei of the particles being generated in the mixed solution excessively increases. Therefore, the particle diameters of the respective particles decrease, and there are cases in which the average particle diameter of the titanium oxide particles to be obtained is too small. In addition, when the concentration of titanium in the mixed solution is higher than 3.0 mol/kg, the dispersibility of the mixed solution changes, and there are cases in which the particle size distribution width of titanium oxide particles being generated in the step (B) excessively increases.

(Molar Ratio Between Titanium Atoms in Mixed Solution and Compound Having Five-Membered Ring Containing Nitrogen)

The molar ratio between titanium atoms in the mixed solution and the compound having a five-membered ring containing nitrogen is preferably in a range of 1.00:0.01 to 1.00:1.00 and more preferably in a range of 1.00:0.10 to 1.00:0.70. When the molar ratio between titanium atoms in the mixed solution and the compound having a five-membered ring containing nitrogen is in a range of 1.00:0.01 to 1.00:1.00, it is possible to synthesize titanium oxide particles having a narrow particle size distribution width and excellent crystallinity.

(Step (B))

In the step (B), the mixed solution is heated and pressurized, thereby generating titanium oxide fine particles. The step (B) is preferably carried out using a high-temperature and high-pressure container (autoclave). In the step (B), titanium oxide fine particles are generated by a hydrothermal reaction of the mixed solution. After the reaction by heating and pressurizing is completed, a dispersion solution in which the titanium oxide fine particles are dispersed is obtained.

(Heating and Pressurizing)

The heating temperature in the step (B) is preferably 150° C. to 350° C. and more preferably 150° C. to 210° C. In addition, the pressure in the step (B) is a pressure at which the mixed solution is heated to the above-described temperature in a closed container. When the heating temperature and the pressure in the step (B) are in the above-described ranges, it is possible to dissolve the hydrolysis product in water in the mixed solution and generate titanium oxide particles by generating nuclei of the titanium oxide particles and growing the nuclei. The temperature-increase time taken to heat the mixed solution from room temperature to the heating temperature is preferably 1 to 3 hours.

(Stirring)

In the step (B), it is preferably to heat and pressurize the mixed solution while stirring the mixed solution. The stirring rate is, for example, approximately 100 to 300 rpm and preferably 200 rpm.

(Heating Time)

The heating time at the above-described heating temperature in the step (B) is preferably 3 to 12 hours and more preferably 4 to 9 hours. When the heating time is shorter than 3 hours, there are cases in which the reaction does not fully end, and, when the heating time is longer than 12 hours, there are cases in which heating is continued for a long period of time even after the reaction of the mixed solution is completed.

Meanwhile, after the completion of the reaction, a dispersion solution in which titanium oxide fine particles are dispersed in a solution can be obtained, and according to necessity, the obtained titanium oxide particles may be cleaned with pure water or the like in order to remove impurities and the like.

After the completion of the reaction, the dispersion solution including titanium oxide particles may be used as it is or titanium oxide particles may be used after being collected from the dispersion solution by means of solid-liquid separation or the like and dried, and the dispersion solution may have a desired form depending on the applications.

The dispersion solution including titanium oxide particles obtained by the production method of the present invention or titanium oxide particles that are obtained by drying the dispersion solution may be used as titanium oxide particles for semiconductor layers or insulating layers in dye-sensitized solar cells or may be used as photocatalyst particles for photocatalysts.

(Titanium Oxide Particles and Dispersion Solution of Titanium Oxide Particles)

By the above-described method for producing titanium oxide particles of the present invention, for example, titanium oxide particles including an anatase single phase having an average particle diameter of 5 to 100 nm and a dispersion solution of titanium oxide particles which contains the same can be obtained.

(Particle Size Distribution of Dispersion Solution of Titanium Oxide Particles)

When the mixed solution is hydrothermally reacted in the step (B), titanium oxide particles are obtained in a dispersion solution of the titanium oxide particles. The particle size distribution width of titanium oxide particles in the dispersion solution is, for example, 20 to 92 nm, and the 90% cumulative strength particle size distribution diameter D90 of the titanium oxide particles is, for example, 58 nm or less.

In addition, depending on the conditions of the step (A) and the step (B), it is possible to set the particle size distribution width of the titanium oxide particles to 18 to 52 nm, set the 90% cumulative strength particle size distribution diameter D90 of the titanium oxide particles to 42 nm or less, furthermore, set the particle size distribution width of the titanium oxide particles to 13 to 41 nm, and set the 90% cumulative strength particle size distribution diameter D90 of the titanium oxide particles to 32 nm or less. Therefore, by the method for producing titanium oxide particles of the present invention, it is possible to obtain titanium oxide particles having an extremely narrow particle size distribution width.

(PDI of Dispersion Solution of Titanium Oxide Particles)

The cumulant polydispersity index (PDI) of titanium oxide particles in the titanium oxide particle dispersion solution of the present invention, which is measured on the basis of JIS Z8828, is preferably 0.50 or less and more preferably 0.30 or less. PDI is the abbreviation of polydispersity index and means that the monodispersity becomes more favorable as the value lowers. When the PDI of titanium oxide particles is 0.50 or less, the particle size distribution width is narrow, and, in a case in which the titanium oxide particles are used for semiconductor electrodes in dye-sensitized solar cells, high photoelectric conversion efficiencies can be obtained.

Since the value of PDI is preferably low, the lower limit value is not particularly limited, but PDI may be 0.01 or more, 0.10 or more, or 0.15 or more.

(Average Particle Diameter of Dispersion Solution of Titanium Oxide Particles)

The average particle diameter (50% cumulative strength particle size distribution diameter D50) of the dispersion solution of titanium oxide particles obtained by the method for producing titanium oxide particles of the present invention is preferably 10 to 100 nm and more preferably 15 to 80 nm. When the average particle diameter of the dispersion solution of titanium oxide particles is less than 10 nm, the dispersibility cannot be maintained when the titanium oxide particles are blended into paste, and, when the average particle diameter exceeds 100 nm, in a case in which the titanium oxide particles are used for semiconductor electrodes in dye-sensitized solar cells, it is not possible to sufficiently adsorb dyes.

(BET Specific Surface Area of Titanium Oxide Particles)

The BET specific surface area of titanium oxide particles is preferably 40 to 150 $m^2/g$ and more preferably 50 to 100 $m^2/g$. When the BET specific surface area of titanium oxide particles is less than 40 $m^2/g$, in a case in which the titanium oxide particles are used for semiconductor electrodes in dye-sensitized solar cells, there are cases in which it is not possible to sufficiently adsorb dyes, and, when the BET specific surface area exceeds 150 $m^2/g$, there are cases in which the dispersibility cannot be maintained when the titanium oxide particles are blended into paste.

($D_{XRD(100)}/D_{XRD(001)}$ of titanium oxide particles)

$D_{XRD(100)}/D_{XRD(001)}$ of titanium oxide particles is preferably 0.2 to 1.0, more preferably 0.4 to 0.8, and still more preferably 0.5 to 0.8. When $D_{XRD(100)}/D_{XRD(001)}$ of titanium oxide particles is 0.2 to 1.0, in a case in which the titanium oxide particles are used for semiconductor electrodes in dye-sensitized solar cells, high photoelectric conversion efficiencies can be obtained. Here, $D_{XRD(100)}/D_{XRD(001)}$ is the ratio of the Scherrer diameter that is computed from the diffraction peak half-value width of a (100) plane to the Scherrer diameter that is computed from the diffraction peak half-value width of a (001) plane in the X-ray diffraction pattern of titanium oxide particles.

Therefore, in the method for producing titanium oxide particles of the present invention, titanium oxide particles having a narrow particle size distribution, a stable shape, and excellent crystallinity can be obtained.

As described above, after the step (B), titanium oxide particles fall into a state of a dispersion solution. Titanium oxide particles may be used after being separated from the dispersion solution. In addition, titanium oxide particles may be used in a state of the dispersion solution. Since the dispersion solution of titanium oxide particles which is generated after the step (B) is highly transparent, coated films produced using this dispersion solution also become highly transparent. For the above-described high transparency of the dispersion solution, titanium oxide particles produced by the method for producing titanium oxide particles of the present invention are particularly suitable for the applications of photocatalysts, transparent ultrahydrophilic films, and photosemiconductor porous films in dye-sensitized solar cells.

The dispersion solution of the titanium oxide particles generated after the step (B) may be used after substituting water with a different solvent in order to improve the compatibility with a binder described below.

The different solvent is not particularly limited as long as the solvent has favorable compatibility with the binder and is capable of maintaining the characteristics of the titanium oxide particles and the characteristics of the dispersion solution even when water is substituted with the solvent. The above-described solvent is preferably an alcohol and more particularly preferably methanol or ethanol.

That is, the dispersion solution of titanium oxide particles of the present invention contains the compound having a five-membered ring containing nitrogen, the ratio ($D_{XRD(100)}/D_{XRD(001)}$) of the Scherrer diameter ($D_{XRD(100)}$) that is computed from the half-value width of the diffraction peak of the (100) plane to the Scherrer diameter ($D_{XRD(001)}$) that is computed from the half-value width of the diffraction peak of the (001) plane in the X-ray diffraction pattern of the titanium oxide particles is 0.2 to 1.0, and the cumulant polydispersity index (PDI) of the titanium oxide particles measured on the basis of JIS 28828 is 0.50 or less.

In the method for producing titanium oxide particles of the present invention, the amount of the compound having a five-membered ring containing nitrogen blended into 1 mol of titanium atoms in the hydrolysis product is preferably 0.01 to 1.0 mol, more preferably 0.1 to 0.7 mol, and still more preferably 0.1 to 0.5 mol. Therefore, the content of the compound having a five-membered ring containing nitrogen in the dispersion solution of titanium oxide particles of the present invention is preferably 0.01 to 1.0 mol, more preferably 0.1 to 0.7 mol, and still more preferably 0.1 to 0.5 mol with respect to 1 mol of titanium atoms.

[Dispersion Solution of Titanium Oxide Particles]

The dispersion solution of titanium oxide particles of the present invention is a dispersion solution of titanium oxide particles containing a compound having a five-membered ring containing nitrogen, the ratio ($D_{XRD(100)}/D_{XRD(001)}$) of the Scherrer diameter ($D_{XRD(100)}$) that is computed from the half-value width of the diffraction peak of the (100) plane to the Scherrer diameter ($D_{XRD(001)}$) that is computed from the half-value width of the diffraction peak of the (001) plane in the X-ray diffraction pattern of the titanium oxide particles is 0.2 to 1.0, and the cumulant polydispersity index of the titanium oxide particles measured on the basis of JIS 28828 is 0.50 or less.

Furthermore, the compound having a five-membered ring containing nitrogen, the ratio ($D_{XRD(100)}/D_{XRD(001)}$) of the Scherrer diameter ($D_{XRD(100)}$), and the cumulant polydispersity index of the titanium oxide particles are the same as those described in the section of the method for producing titanium oxide particles of the present invention and thus will not be described again.

[Titanium Oxide Paste]

Titanium oxide paste of the present invention includes at least one of titanium oxide particles produced by the method for producing titanium oxide particles of the present invention and the dispersion solution of titanium oxide particles of the present invention, a solvent, and a binder. Examples of the solvent include terpineol, butyl carbitol, butyl carbitol acetate, acetate, toluene, various alcohols such as methanol and ethanol, xylene, and the like. Furthermore, examples of the binder include ethyl cellulose, polyvinyl butyral, methacrylic resins, butyl methacrylate, and the like. The titanium oxide paste may further include additives such as a dispersant, an activator, and a plasticizer. In addition, the titanium oxide paste of the present invention may also be produced using titanium oxide particles in a state of the above-described dispersion solution.

In addition, the titanium oxide particles of the present invention are produced using the compound having a five-membered ring, in a case in which not sufficiently cleaned or the like, the titanium oxide paste of the present invention is, in other words, titanium oxide paste including titanium oxide particles, a solvent, a binder, and the compound having a five-membered ring containing nitrogen.

The compound having a five-membered ring is preferably completely removed, but significant efforts and costs are required, and thus the complete removal of the compound is difficult with current techniques. Therefore, in practice, the content of the compound having a five-membered ring in the titanium oxide paste of the present invention is preferably 3 ppm or more. The content of the compound having a five-membered ring in the titanium oxide paste of the present invention is preferably 3 to 100 ppm, more preferably 3 to 50 ppm, and still more preferably 3 to 30 ppm.

[Titanium Oxide Film]

A titanium oxide film of the present invention is obtained by applying and calcinating the titanium oxide paste of the present invention. Examples of the method for applying the titanium oxide paste include a spin coating method, a dip coating method, a bar coating method, a spraying method, a blade coating method, a slit die coating method, a gravure coating method, a reverse coating method, a screen printing method, a print transferring method, an ink jet method, and the like. The applied titanium oxide paste is dried as desired and then is calcinated. Therefore, the titanium oxide film of the present invention is formed. The calcination temperature is not particularly limited as long as titanium oxide particles are bonded to each other and thus form titanium oxide porous bodies.

[Dye-Sensitized Solar Cell]

A dye-sensitized solar cell of the present invention includes a conductive substrate, a photosemiconductor electrode carrying a sensitizing dye, a counter electrode, and an electrolyte, and the photosemiconductor electrode has the titanium oxide film of the present invention.

The dye-sensitized solar cell is constituted of a photosemiconductor electrode composed of a dye-absorbed semiconductor fine particle-containing layer formed on the conductive substrate, the electrolyte, and the counter electrode. Particularly, Nature (Vol. 353, pp. 737 to 740, 1991), U.S. Pat. No. 4,927,721 disclose photoelectric conversion elements and solar cells for which semiconductor fine particles sensitized by a dye are used and materials and production techniques for producing the photoelectric conversion elements and the solar cells. In a case in which titanium oxide particles are used for the application of photosemiconductor electrodes in dye-sensitized solar cells, the average particle diameter, crystallinity, particle size distribution, purity, crystal planes, and the like of titanium oxide particles significantly affect the sunlight conversion efficiencies of dye-sensitized solar cells.

Since the titanium oxide film of the present invention is produced using titanium oxide particles produced by the method for producing titanium oxide particles of the present invention, the particle diameters of titanium oxide particles are small, the crystallinity and the purity are high, and the particle size distribution is narrow. Therefore, when titanium oxide particles produced by the method for producing titanium oxide particles of the present invention are used for the application of photosemiconductor electrodes in dye-sensitized solar cells, it is possible to increase the sunlight conversion efficiency of the dye-sensitized solar cell. In addition, in a case in which the titanium oxide film of the present invention is used for the application of photosemiconductor electrodes in dye-sensitized solar cells, it is possible to enhance the transparency of the photosemiconductor electrodes and increase the amount of dyes that are carried by the photosemiconductor electrodes.

Hereinafter, an example of the method for producing a dye-sensitized solar cell in a case in which the titanium oxide film of the present invention is used as a photosemiconductor electrode. The method for producing a dye-sensitized solar cell includes a step of producing a conductive substrate, a step of forming a photosemiconductor electrode, a step of carrying a dye in the photosemiconductor electrode, a step of disposing a counter electrode, and a step of injecting an electrolyte.

(Step of Producing Conductive Substrate)

A transparent substrate is prepared, and a transparent conductive layer is formed thereon, thereby producing a conductive substrate. The transparent conductive layer can be formed using a well-known film-forming technique such as a sputtering method, a CVD method, or a coating method. In addition, it is also possible to use a commercially available transparent substrate on which a transparent conductive layer is formed as the transparent conductive substrate. Examples of the transparent conductive layer include a tin-doped indium oxide (ITO) layer, a fluorine-doped tin oxide (FTC)) layer, an antimony-doped tin oxide (ATO)/ITO complex layer, a tin oxide layer, a zinc oxide layer, a $TiO_2/Ag/TiO_2$ complex layer, and the like. In addition, in order to improve the electrical conductivity of the conductive substrate, metal lattice wires of Ag, Cu, and the like may be further provided in the conductive substrate.

(Step of Forming Photosemiconductor Electrode)

The titanium oxide paste of the present invention is screen-printed on the above-described transparent conductive substrate, is dried and calcinated, thereby forming the titanium oxide film of the present invention. This titanium oxide film serves as a photosemiconductor electrode.

The calcination temperature of the titanium oxide paste of the present invention is preferably 250° C. to 600° C. and more preferably 400° C. to 550° C. When the calcination temperature of the titanium oxide paste is lower than 250° C., favorable bonds between titanium oxide particles cannot be obtained, and thus there are cases in which the resistance of the photosemiconductor electrode increases. In addition, when the calcination temperature of the titanium oxide paste is higher than 600° C., titanium oxide particles significantly grow, and there are cases in which the specific surface area of the photosemiconductor electrode becomes too small.

(Step of Carrying Dye in Photosemiconductor Electrode)

A sensitizing dye is dissolved in a predetermined solvent, thereby producing a sensitizing dye solution. Examples of the solvent that is used for the production of the sensitizing dye solution include alcohols such as methanol, ethanol, 2-propanol, 1-butanol, and t-butanol, nitriles such as acetonitrile, methoxyacetonitrile, propionitrile, and 3-methoxypropionitrile, and solvent mixtures thereof.

As the sensitizing dye that is used for the production of the sensitizing dye solution, it is possible to use metal complex dyes, organic dyes, and the like. Examples of the metal complex dyes include metal phthalocyanine, chlorophyll, hemin, metal complex salts containing at least one selected from the group consisting of ruthenium, osmium, iron, and zinc, and the like. The metal complex dyes are preferably ruthenium metal complexes. Examples of preferred ruthenium metal complexes include ruthenium bipyridine complexes and ruthenium terpyridine complexes. Examples of the organic dyes include coumalin derivative-based dyes, polyene-based dyes, merocyanine-based dyes, azo-based dyes, quinone-based dyes, squarylium-based dyes, cyanine-based dyes, styryl-based dyes, xanthene-based dyes, and the like. Preferred organic dyes are coumalin derivative-based dyes.

The conductive substrate on which the photosemiconductor electrode is formed is immersed in the sensitizing dye solution, thereby carrying the sensitizing dye in the photosemiconductor electrode.

(Step of Disposing Counter Electrode)

A counter electrode is disposed at a location opposite to the photosemiconductor electrode. Examples of the counter electrode include metal electrodes of Al, SUS, or the like, substrates constituted of glass, plastic, or the like, conductive substrate electrodes constituted of a conductive layer of Pt, C, Ni, Cr, stainless steel, fluorine-doped tin oxide, ITO, or the like which is formed on the above-described substrate, and the like.

(Step of Injecting Electrolyte)

An electrolyte is injected between the photosemiconductor electrode and the counter electrode, and the electrolyte is interposed between the photosemiconductor electrode and the counter electrode, whereby a dye-sensitized solar cell can be obtained. As the electrolyte for the dye-sensitized solar cell, it is possible to use solid electrolytes and liquid electrolytes. Examples of the electrolyte for the dye-sensitized solar cell include iodine-based electrolytes, bromine-based electrolytes, selenium-based electrolytes, sulfur-based electrolytes, and the like. Preferred electrolytes are iodine-based electrolytes, and preferred iodine-based electrolytes are solutions obtained by dissolving at least one selected from the group consisting of $I_2$, LiI and dimethylpropylimidazolium iodide in an organic solvent such as acetonitrile, methoxyacetonitrile, propylene carbonate, or ethylene carbonate. Meanwhile, in a case in which a liquid electrolyte is used, a partition is provided between the photosemiconductor electrode and the counter electrode, and then the electrolyte is injected into the space between the photosemiconductor electrode and the counter electrode.

For example, in the above-described manner, dye-sensitized solar cells can be produced using the titanium oxide film of the present invention. Dye-sensitized solar cells having a sufficiently high photoelectric conversion efficiency can be obtained by using the titanium oxide film of the present invention as the photosemiconductor electrode.

EXAMPLES

Hereinafter, the present invention will be described in more detail using examples. Meanwhile, the examples do not limit the present invention.

[Production of Specimens]

Dispersion solutions of titanium oxide particles of Examples 1 to 6 and Comparative Examples 1 to 6 were produced in the following manner.

Example 1

1 L of pure water was injected into a beaker having a capacity of 2 L, and 1 mol of tetraisopropoxytitanium (manufactured by Nippon Soda Co., Ltd., trade name: A-1) was added dropwise under stirring, thereby obtaining a white suspension. This white suspension was filtered, thereby obtaining a hydrolysis product of a titanium alkoxide. Next, the hydrolysis product as much as the content of titanium atoms reached 1 mol, 0.15 mol of pyrrolidine (manufactured by Kanto Chemical Co., Ltd.) with respect to 1 mol of titanium atoms in the hydrolysis product, and pure water as much as the total amount of the hydrolysis product, pyrrolidine, and the pure water reached 1 kg were injected into an autoclave (manufactured by Ueda Technology Co., Ltd., model No.: SR-200) and were mixed together, thereby producing a mixed solution. In addition, the mixed solution was heated at a heating temperature of 210° C. for four hours 30 minutes in the autoclave, thereby producing a dispersion solution of titanium oxide particles of Example 1. Since the autoclave was closed, the mixed solution was pressurized by heating the mixed solution to the heating temperature of 210° C. in the autoclave.

Example 2

A dispersion solution of titanium oxide particles of Example 2 was produced in the same manner as in Example 1 except for the fact that 1,5-diazabicyclo-[4.3.0]-5-nonene (manufactured by Tokyo Chemical Industry Co., Ltd.) was blended instead of pyrrolidine.

Example 3

A dispersion solution of titanium oxide particles of Example 3 was produced in the same manner as in Example 1 except for the fact that the heating temperature was changed from 210° C. to 230° C.

Example 4

A dispersion solution of titanium oxide particles of Example 4 was produced in the same manner as in Example 1 except for the fact that the amount of pyrrolidine blended was changed to an amount blended which reached 0.19 mol with respect to 1 mol of titanium atoms in the hydrolysis product.

Example 5

A dispersion solution of titanium oxide particles of Example 5 was produced in the same manner as in Example 1 except for the fact that 1,5-diazabicyclo-[4.3.0]-5-nonene (manufactured by Tokyo Chemical Industry Co., Ltd.) was blended instead of pyrrolidine in an amount blended which reached 0.19 mol with respect to 1 mol of titanium atoms in the hydrolysis product.

Example 6

A dispersion solution of titanium oxide particles of Example 6 was produced in the same manner as in Example 1 except for the fact that the amount of pyrrolidine blended was changed to an amount blended which reached 0.12 mol with respect to 1 mol of titanium atoms in the hydrolysis product.

Comparative Example 1

A dispersion solution of titanium oxide particles of Comparative Example 1 was produced in the same manner as in Example 1 except for the fact that an aqueous solution of 25 wt % of tetramethylammonium hydroxide (manufactured by Tama Chemicals Co., Ltd.) was blended instead of pyrrolidine.

Comparative Example 2

A dispersion solution of titanium oxide particles of Comparative Example 2 was produced in the same manner as in Example 1 except for the fact that triethanolamine (manufactured by Kanto Chemical Co., Inc.) was blended instead of pyrrolidine. However, titanium oxide agglomerated and settled, and, in the dispersion solution of titanium oxide particles of Comparative Example 2, it was not possible to favorably disperse titanium oxide particles.

Comparative Example 3

A dispersion solution of titanium oxide particles of Comparative Example 3 was produced in the same manner as in Example 1 except for the fact that ethanolamine (manufactured by Kanto Chemical Co., Inc.) was blended instead of pyrrolidine. However, titanium oxide agglomerated and settled, and, in the dispersion solution of titanium oxide particles of Comparative Example 3, it was not possible to favorably disperse titanium oxide particles.

Comparative Example 4

A dispersion solution of titanium oxide particles of Comparative Example 4 was produced in the same manner as in Example 1 except for the fact that diethanolamine (manufactured by Kanto Chemical Co., Inc.) was blended instead of pyrrolidine. However, titanium oxide agglomerated and settled, and, in the dispersion solution of titanium oxide particles of Comparative Example 4, it was not possible to favorably disperse titanium oxide particles.

Comparative Example 5

A dispersion solution of titanium oxide particles of Comparative Example 5 was produced in the same manner as in Example 1 except for the fact that diethylenetriamine (manufactured by Kanto Chemical Co., Inc.) was blended instead of pyrrolidine. However, titanium oxide agglomerated and settled, and, in the dispersion solution of titanium oxide particles of Comparative Example 5, it was not possible to favorably disperse titanium oxide particles.

Comparative Example 6

A dispersion solution of titanium oxide particles of Comparative Example 6 was produced in the same manner as in Example 1 except for the fact that morpholine (manufactured by Kanto Chemical Co., Inc.) was blended instead of pyrrolidine. However, titanium oxide agglomerated and settled, and, in the dispersion solution of titanium oxide particles of Comparative Example 6, it was not possible to favorably disperse titanium oxide particles.

[Evaluation of Specimens]

The dispersion solutions of titanium oxide particles of Examples 1 to 6 and Comparative Examples 1 to 6 were evaluated in the following manner.

(BET Specific Surface Area of Titanium Oxide Particles)

Titanium oxide particles were separated from the dispersion solution by filtering the dispersion solution of titanium oxide particles. In addition, the titanium oxide particles were cleaned with pure water and were then dried at a temperature of 200° C. The BET specific surface area of the dried titanium oxide particles was measured using a specific surface area meter (manufactured by MicrotracBEL Corp., model No.: BELSORP-mini).

(Average Particle Diameter and 90% Cumulative Strength Particle Size Distribution Diameter D90 (μm) of Titanium Oxide Particles)

The average particle diameters (50% cumulative strength particle size distribution diameter) and the 90% cumulative strength particle size distribution diameter D90 of the titanium oxide particles in the dispersion solution of titanium oxide particles were measured using a particle size distribution meter (manufactured by Horiba Ltd., model No.: SZ-100).

(PDI of Dispersion Solution of Titanium Oxide Particles)

The cumulant polydispersity index (PDI) of the titanium oxide particles in the dispersion solution of titanium oxide particles was measured using a particle size distribution meter model No. SZ-100 (manufactured by Horiba Ltd.).

(Identification of Crystal Phase of Titanium Oxide Particles and $D_{XRD(100)}/D_{XRD(001)}$)

Titanium oxide particles were separated from the dispersion solution by filtering the dispersion solution of titanium oxide particles. In addition, the titanium oxide particles were cleaned with pure water and were then dried at a temperature of 200° C. The crystal phase of the dried titanium oxide particles and the $D_{XRD(100)}/D_{XRD(001)}$ of the X-ray diffraction pattern were investigated using an X-ray diffraction device (manufactured by Spectris Company, model No.: X'Pert PRO). $D_{XRD(100)}/D_{XRD(001)}$ is the ratio of the Scherrer diameter that is computed from the diffraction peak half-value width of a (100) plane to the Scherrer diameter that is computed from the diffraction peak half-value width of a (001) plane in the X-ray diffraction pattern of titanium oxide particles.

(Measurement of Photoelectric Conversion Efficiency of Dye-Sensitized Solar Cell)

Dye-sensitized solar cells were produced using the dispersion solutions of titanium oxide particles of Examples 1 to 6 and Comparative Example 1, and the photoelectric conversion efficiencies of the dye-sensitized solar cells were measured. The dye-sensitized solar cells were produced in the following manner. Meanwhile, since the titanium oxide particles of Comparative Examples 2 to 6 were poorly dispersed, and titanium oxide paste could not be obtained, it was not possible to produce dye-sensitized solar cells using the dispersion solutions of titanium oxide particles of Comparative Examples 2 to 6.

<Production of Titanium Oxide Paste>

The solvents in the dispersion solutions of titanium oxide particles of Examples 1 to 6 and Comparative Example 1 were substituted with ethanol, and alcohol dispersion solutions were produced. An alcohol dispersion solution weighed so that the amount of the alcohol dispersion solution reached 26 parts by mass in terms of titanium oxide, 8 parts by mass of ethyl cellulose (manufactured by The Dow Chemical Company, trade name: ETHOCEL), and 66 parts by mass of terpineol (manufactured by Kanto Chemical Co., Ltd.) were mixed together, thereby producing a mixed solution. Excess ethanol was removed from the mixed solution using an evaporator (manufactured by Tokyo Rikakikai Co., Ltd., model No.: N-1110). The mixed solution from which excess ethanol had been removed was kneaded using a three-roll mill (manufactured by EXAKT, model No.: M-50), thereby obtaining titanium oxide paste.

<Production of Dye-Sensitized Solar Cell Using Titanium Oxide Paste>

The titanium oxide paste was applied onto a transparent conductive film-attached substrate (manufactured by Nippon Sheet Glass Co., Ltd.) by a screen printing method so that a 5 mm×5 mm-sized film became 7 μm thick after calcination. In addition, the applied titanium oxide paste was calcinated so as to form a titanium oxide film (titanium oxide porous body) on the transparent conductive film-attached substrate, thereby producing a titanium oxide film (titanium oxide porous body)—attached substrate. The titanium oxide film (titanium oxide porous body)—attached substrate obtained in the above-described manner was immersed in 10 mL of a Ru metal complex dye (Black Dye dye) solution (manufactured by DYESOL) having a concentration of $3\times10^{-4}$ mol/L for 24 hours, thereby carrying a sensitizing dye in the titanium oxide film (titanium oxide porous body). Next, the titanium oxide film (titanium oxide porous body)—attached substrate and a counter electrode substrate having a platinum film formed on the surface were disposed in a container for dye-sensitized solar cells so as to face each other, a liquid electrolyte (a liquid electrolyte produced by adding 0.6 M of an iodine salt of 1,2-dimethyl-3-propylimidazolium (manufactured by Kanto Chemical Co., Ltd.), 0.1 M of lithium iodide (manufactured by Kanto Chemical Co., Ltd.), 0.05 M of iodine (manufactured by Kanto Chemical Co., Ltd.), and 0.5 M of tertiary butylpyridine (manufactured by Kanto Chemical Co., Ltd.) to acetonitrile (manufactured by Kanto Chemical Co., Ltd.)) was injected between the substrates, and the container was sealed, thereby producing a dye-sensitized solar cell.

<Measurement of photoelectric conversion efficiencies>Pseudo-sunlight was radiated to the dye-sensitized solar cell using a solar simulator (manufactured by Yamashita Denso Corp., model No.: YSS-100AAH), and the I-V characteristics were measured using a current and voltage measurement instrument (manufactured by ADC Corporation, model No.: 6243), thereby obtaining a photoelectric conversion efficiency. Here, since the measurement of the I-V characteristics by means of the production of dye-sensitized solar cells was significantly fluctuant, the photoelectric conversion efficiencies of the dye-sensitized solar cells for which photosemiconductor electrodes produced using the dispersion solutions of titanium oxide particles of Examples 1 to 6 and Comparative Example 1 were used were obtained by means of standardization using the photoelectric conversion characteristics of a dye-sensitized solar cell for which a photosemiconductor electrode produced using the dispersion solution of titanium oxide particles of Comparative Example 1 as a reference.

[Evaluation Results]

The evaluation results of the dispersion solutions of titanium oxide particles in Examples 1 to 6 and Comparative Examples 1 to 6 are shown in Table 1.

TABLE 1

| | Example 1 | Example 2 | Example 3 | Example 4 | Example 5 | Example 6 | Comparative Example 1 |
|---|---|---|---|---|---|---|---|
| Catalyst for hydrothermal synthesis | Pyrrolidine | DBN*[1] | Pyrrolidine | Pyrrolidine | DBN*[1] | Pyrrolidine | TMAH*[2] |
| Amount of catalyst blended into 1 mol of titanium atoms (mol) | 0.15 | 0.15 | 0.15 | 0.19 | 0.19 | 0.12 | 0.15 |
| Heating temperature (° C.) | 210 | 210 | 230 | 210 | 210 | 210 | 210 |
| Specific surface area ($m^2/g$) | 75 | 74 | 72 | 62 | 64 | 88 | 66 |
| Average particle diameter (nm) | 35 | 46 | 39 | 44 | 43 | 32 | 47 |
| 90% cumulative strength particle size distribution diameter D90 (nm) | 75 | 82 | 79 | 91 | 90 | 63 | 95 |
| Cumulant polydispersity index (PDI) | 0.24 | 0.26 | 0.23 | 0.30 | 0.29 | 0.19 | 0.29 |

TABLE 1-continued

| | | | | | | | |
|---|---|---|---|---|---|---|---|
| Crystal phase | Anatase | Anatase | Anatase | Anatase | Anatase | Anatase | Anatase |
| $D_{XRD(100)}/D_{XRD(001)}$ | 0.74 | 0.69 | 0.71 | 0.73 | 0.72 | 0.68 | 0.70 |
| Photoelectric conversion efficiency (%) | 4.6 | 4.7 | 4.5 | 4.5 | 4.5 | 4.6 | 4.5 |

| | Comparative Example 2 | Comparative Example 3 | Comparative Example 4 | Comparative Example 5 | Comparative Example 6 |
|---|---|---|---|---|---|
| Catalyst for hydrothermal synthesis | TEA*[3] | Ethanolamine | DEA*[4] | DETA*[5] | Morpholine |
| Amount of catalyst blended into 1 mol of titanium atoms (mol) | 0.15 | 0.15 | 0.15 | 0.15 | 0.15 |
| Heating temperature (° C.) | 210 | 210 | 210 | 210 | 210 |
| Specific surface area (m²/g) | 87 | 100 | 108 | 57 | 100 |
| Average particle diameter (nm) | 3,400 | 200 | 230 | 630 | 400 |
| 90% cumulative strength particle size distribution diameter D90 (nm) | >4,000 | 890 | 610 | 1,520 | 1,100 |
| Cumulant polydispersity index (PDI) | 0.64 | 0.53 | 0.55 | 0.58 | 0.55 |
| Crystal phase | Anatase | Anatase | Anatase | Anatase | Anatase |
| $D_{XRD(100)}/D_{XRD(001)}$ | 0.67 | 0.71 | 1.2 | 0.74 | 0.68 |
| Photoelectric conversion efficiency (%) | — | — | — | — | — |

*[1]DBN: 1,5-Diazabicyclo-[4.3.0]-5-nonene
*[2]TMAH: Aqueous solution of 25 wt % of tetramethylammonium hydroxide
*[3]TEA: Triethanolamine
*[4]DEA: Diethanolamine
*[5]DETA: Diethylenetriamine

[Results]

From the comparison between the evaluation results of Examples 1 to 6 and the evaluation result of Comparative Example 1, it was found that, according to the present invention, titanium oxide particles having excellent characteristics can be produced even without using TMAH. In addition, from the comparison between the evaluation results of Examples 1 to 6 and the evaluation results of Comparative Examples 2 to 6, it was found that the compound having a five-membered ring containing nitrogen are superior as catalysts for generating titanium oxide particles by means of hydrothermal synthesis to other amine compounds. Furthermore, from the comparison between the evaluation results of Examples 1 to 6 and the evaluation results of Comparative Examples 1 to 6, it was found that dye-sensitized solar cells having a favorable photoelectric conversion efficiency can be obtained by using titanium oxide particles produced by the method for producing titanium oxide particles of the present invention (the dispersion solution of titanium oxide particles).

<Amounts of Compound Having Five-Membered Ring Containing Nitrogen which was Included in Titanium Oxide Paste (Pyrrolidine)>

The amounts of pyrrolidine which was included in the titanium oxide paste of Examples 4 and 6 and Comparative Example 1 were measured.

The titanium oxide paste obtained in the respective examples and the respective comparative examples was extracted with an acid solution, and the amount thereof was measured by means of capillary-electrophoresis method. As a result, 20 ppm of pyrrolidine was detected in the titanium oxide paste of Example 4, 11 ppm of pyrrolidine was detected in the titanium oxide paste of Example 6, and pyrrolidine was not detected in the titanium oxide paste of Comparative Example 1 since the amount thereof was equal to or lower than the lower limit of detection.

From these evaluation results, it was confirmed that, in the titanium oxide paste of Examples 4 and 6, a small amount of the compound having a five-membered ring containing nitrogen which was used as the catalyst remained.

The invention claimed is:

1. A method for producing titanium oxide particles, comprising:
   producing a mixed solution by mixing a hydrolysis product of a titanium alkoxide or a titanium metal salt with a compound having a five-membered ring containing nitrogen; and
   generating titanium oxide fine particles by heating at a temperature of 150° C. to 350° C. and pressurizing the mixed solution,
   wherein a ratio ($D_{XRD(100)}/D_{XRD(100)}$) of a Scherrer diameter ($D_{XRD(100)}$) that is computed from a half-value width of a diffraction peak of a (100) plane to a Scherrer diameter ($D_{XRD(100)}$) that is computed from a half-value width of a diffraction peak of a (001) plane in an X-ray diffraction pattern of the titanium oxide particles is 0.2 to 1.0, and the compound having the five-membered ring containing nitrogen is at least one compound selected from the group consisting of pyrrole, indole, pyrrolidine, isothiazole, isoxazole, furazan, carbazole, and 1,5-diazabicyclo-[4.3.0]-5-nonene.

2. The method according to claim 1, wherein a cumulant polydispersity index (PDI) of the titanium oxide particles measured on a basis of JIS Z8828 is 0.50 or less.

3. The method according to claim 1, wherein an amount of the compound having the five-membered ring containing nitrogen in the hydrolysis product is 0.01 to 1.0 mol per 1 mol of titanium atoms.

* * * * *